United States Patent Office.

JOHN W. BURNHAM, OF WINTERPORT, MAINE.

Letters Patent No. 62,111, dated February 19, 1867.

IMPROVED LINIMENT.

The Schedule referred to in these Letters Patent and making part of the same.

TO ALL WHOM IT MAY CONCERN:

Be it known that I, JOHN W. BURNHAM, of Winterport, in the county of Waldo, in the State of Maine, have invented a new and improved Medicament; and I do hereby declare that the following is a full and exact description thereof, reference being had to the accompanying ingredients.

This compound, which I call the Yankee Liniment, consists of the following ingredients in the described proportions, to wit: oil of spruce, one ounce; oil of hemlock, one ounce; oil of cedar, one ounce; oil of organum, one ounce; oil of rosemary, one ounce; oil of juniper, one ounce; oil of sassafras, one ounce; oil of rectified amber, one ounce; aqua ammonia, of the strongest kind, one ounce; sweet oil, one ounce; tincture of arnica, one ounce; fir balsam, one ounce; spirits of turpentine, one ounce; laudanum, one ounce; gum of camphor, one ounce; Turkey gum myrrh, one ounce; alcohol, eighteen ounces.

My liniment is prepared in the following manner: To one ounce of pulverized gum myrrh are added eighteen ounces of alcohol; this mixture is allowed to stand two or three days, when it is strained off, and one ounce of gum of camphor dissolved in it; the other ingredients named are then added, the aqua ammonia last of all. The resulting compound, having been well stirred, is put into a bottle, which is tightly corked and allowed to stand about two days, when the compound is strained through a cloth two or three times. Before bottling it should be well shaken, and after bottling it should be excluded from the air.

What I claim as new, and desire to secure by Letters Patent, is—

The liniment, consisting of the ingredients mentioned, combined substantially as described.

JOHN W. BURNHAM.

Witnesses:
 GEO. H. HALL,
 N. E. HALL.